Oct. 14, 1947.  E. G. GAGE  2,428,966

UNIFREQUENCY RADIO BEACON SYSTEM

Filed May 8, 1944  4 Sheets-Sheet 3

INVENTOR.
EDWARD G. GAGE

BY

ATTORNEY.

Oct. 14, 1947.  E. G. GAGE  2,428,966
UNIFREQUENCY RADIO BEACON SYSTEM
Filed May 8, 1944  4 Sheets-Sheet 4

*Fig. 8.*

INVENTOR.
EDWARD G. GAGE
BY
*Fred K. Schuetz*
ATTORNEY.

Patented Oct. 14, 1947

2,428,966

UNITED STATES PATENT OFFICE 2,428,966

UNIFREQUENCY RADIO BEACON SYSTEM

Edward G. Gage, Brooklyn, N. Y.

Application May 8, 1944, Serial No. 534,548

14 Claims. (Cl. 250—11)

The invention relates to radio beacon systems and to a novel method of operating the same, and is concerned more especially with that class known as omnidirectional beacons. It has heretofore been customary to allocate a special frequency for each radio beacon in a given district. The exception has been the case of a group of several beacons in the same district operating at the same frequency, but at comparatively widely separated time intervals, for example one minute apart, to enable pilots to obtain bearings by the null method on these beacons in rotation.

This arrangement does not permit of the simultaneous reception of all the beacons in the district, or at least two or three of them, which is desirable, for example, in taking bearings from a high-speed plane or boat, where it may be necessary or desirable to be able to determine at all times the position of the vehicle. With the rapid increase in number of craft using the radio beacons, the allocation of frequencies has become more and more of a problem, as the available channels in the low-frequency spectrum become more crowded.

It has been seriously proposed in view of this difficulty to shift aircraft beacons to the ultra-high frequencies, where more channels are available. However, it has not been found possible to determine direction or position at these frequencies with the simplicity and accuracy with which they may be determined at the lower or intermediate frequencies.

The present invention makes it possible to operate easily on a single frequency a system comprising as many as ten beacons and many more with careful attention to design of the apparatus. The novel system in addition provides for the automatic triangulation of these beacons from swiftly moving craft.

An object of the present invention is to provide means whereby the pilot of a plane or boat may at all times determine its position or direction by referring to characteristic image lines on a cathode ray tube screen.

Another object is to synchronize a plurality of radio transmitters to operate sequentially at the same radio frequency and at a frequency within the range of the persistence of vision, whereby the resultant received energy is translated into a visual pattern on a screen.

Another object is to eliminate land lines between beacons, making it possible to synchronize moving transmitters such as planes or ships in formation, or beacons located on water such as lightships.

Another object is to characterize each image on the screen, representative of a particular beacon, by introducing characteristic indicia on the image or by its appearance and disappearance on the screen in accordance with a predetermined code, such as the Morse code, for example.

Another object is to permit multiplex telegraphy by means of a characterized "blinker" system, wherein each individual image line on the screen constitutes a separate "blinker."

Another object is to provide a novel delay circuit such as an "acoustical inductance" or electrical or magnetic inertia means for rapid sequential switching of pulse energy.

Another object is to provide means for preventing interference between beacons of the same frequency.

Other and ancillary objects will hereinafter appear.

In carrying out the invention, a number of radio beacons of the omnidirectional type located in the same zone or district, for example, are operated by delayed pulse energy received from a master beacon, preferably centrally located with reference to the surrounding beacons.

All beacons are of the same radio frequency and the energies transmitted are received sequentially on a cathode ray tube direction finder and appear simultaneously within the persistence of vision as characterized illuminated radial lines extending from the center of the screen of the tube outwardly to a circular scale indicating both direction and distance. Such a cathode ray combination direction and position finder has been described in my U. S. Letters Patent No. 2,255,659 and may be called, for convenience, an automatic triangulator.

A better understanding of the invention may be had by referring to the accompanying drawings, in which:

Fig. 4 is a diagrammatic view illustrating the electrical circuits and means for retransmitting energy received from the master transmitter, Fig.

1, with acoustical means introduced for effecting a delay in the retransmission.

Figure 1:
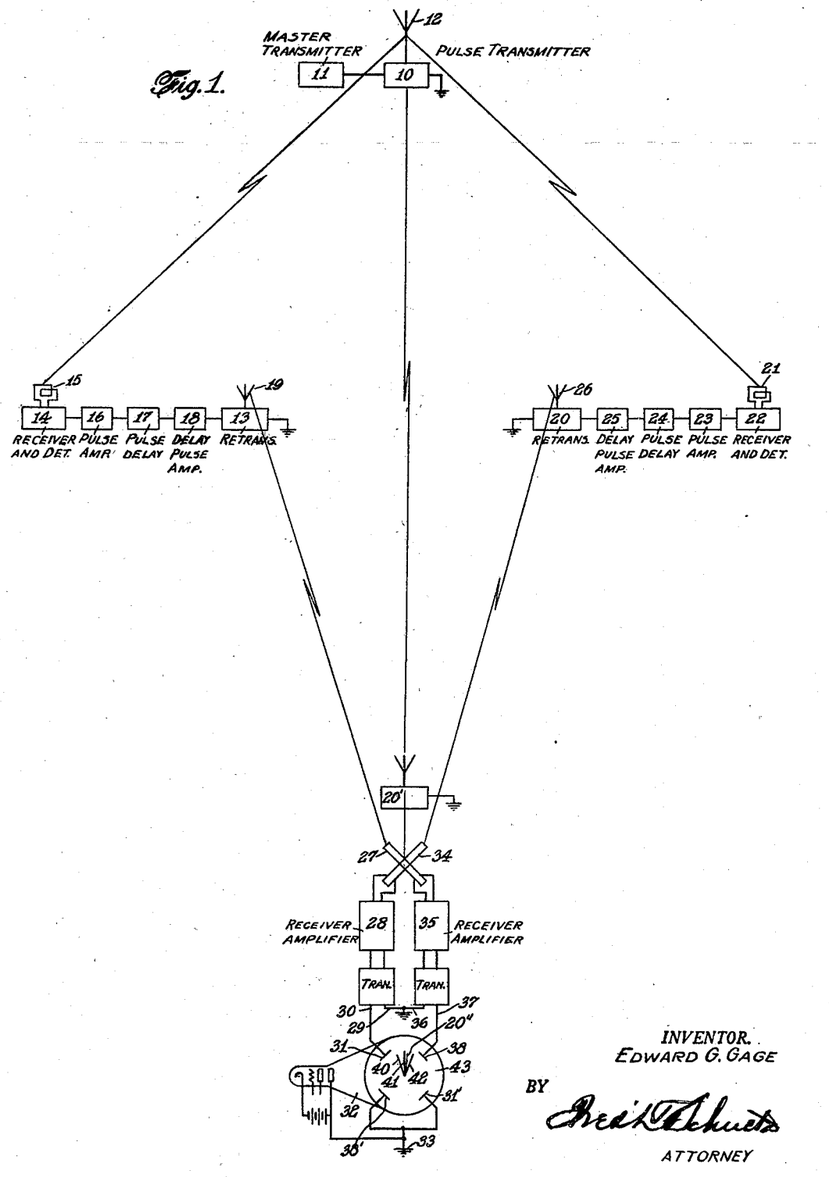
Fig. 1 is a schematic block representation of the novel radio beacon system and illustrates one arrangement of locating the various stations.

Referring to Fig. 1 of the drawings, 10 designates a radio master transmitter, the plate circuit of the oscillator being fed from a pulse generator 11 which is preferably of the mechanical type, although one of the electronic type may also be used. The usual omnidirectional transmitting antenna is indicated at 12.

A second transmitter 13 similar to the first is located at a point distant therefrom and operates at the same frequency as that of said master transmitter. It is provided to this end with the plate circuit of an oscillator fed from a received and amplified delayed pulse from the master transmitter. The receiver 14 for this pulse energy is provided with receiving loop 15, both being tuned to transmitter 10, and connects with the pulse energy amplifier 16, pulse delay circuit 17, and delay circuit amplifier 18. The output of amplifier 18 connects to a second antenna 19 similar to the first antenna 12 and is designed to retransmit the pulse energy received therefrom.

A third transmitter 20, similar to the said second transmitter and operating at the same frequency with receiving loop 21, both being tuned to the first transmitter 10, is located at a point distant from the said master transmitter and the second transmitter 13. The transmitter 20 is connected with a second receiver 22, similar to the receiver 14, the pulse amplifier 23, the delayed pulse circuit 24, and the delayed pulse amplifier 25, the output of which feeds the plate circuit of the oscillator of the transmitter 20, energizing the antenna 26 thereof at the same frequency as transmitter 10.

A cathode ray tube direction finder is located at the observation station, distant from all of the hereinbefore noted transmitters but having associated therewith a retransmitter system 20' similar to transmitters 13 and 20 for the purpose of producing locally a reference indication 20". This direction finder may be of the Watson-Watt type and comprises a first receiving loop 27, the first receiver 28 of which is tuned to the frequency of all of the transmitters 10, 13, 20 and 20', and an amplifier, the output leads 29 and 30 of which are shown respectively grounded and connected to a horizontal deflector 31 of the cathode ray tube 32, the cooperating deflector 31' being connected to the receiver through ground 33. At 34 and 35 are shown the second receiving loop and second receiver also tuned to transmitters 10, 13, 20 and 20', the amplifier output leads being shown at 36 and 37, the latter of which is connected to a vertical deflector 38 of cathode ray tube 32, the cooperating vertical deflector 38' being connected to the output of receiver 35 through the ground 33. Characterized images 40, 41, and 42 are indicated on the cathode ray tube screen 43, as well as the reference line 20".

Figure 2:
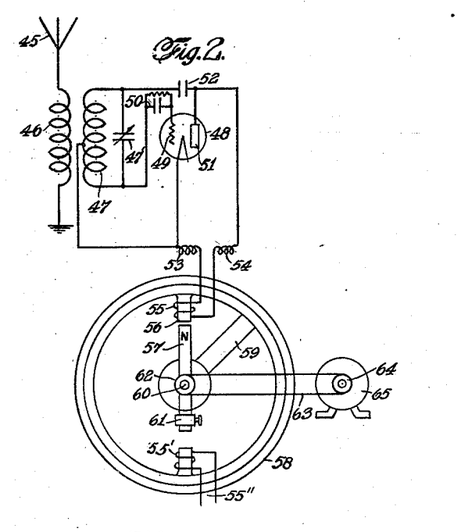
Fig. 2 is a diagrammatic view illustrating a form of pulse generator, for energizing the master transmitter of the beacon system, and the transmitter connections.

A schematic diagram of the master transmitter is shown in Fig. 2, the same including an antenna 45, the coupling coil 46, the tank coil 47, the tuning condenser 47' of the oscillator 48, with grid 49 and grid-leak condenser 50, plate 51 blocking condenser 52, and inductances 53 and 54. The plate circuit is fed by the pulse energy induced in armature coil 55 and core 56 by the revolving field pole or magnet 57 of the mechanical pulse generator 58. This generator includes a yoke 59 with shaft 60 completing the magnetic circuit intermittently by means of a magnetized iron field pole 57 having counterbalance 61, both being mounted on the shaft 60 and rotated by means of the pulley 62 through a belt 63, which is operated by the pulley 64 on the shaft of a motor 65. Further armatures such as the coil 55' and pulse circuit 55" may be provided for additional frequencies.

Figure 4:
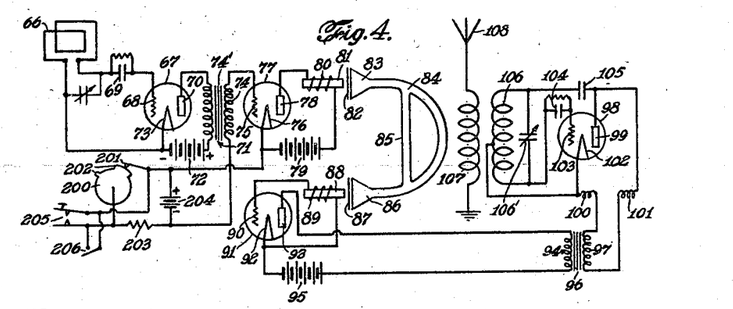

A schematic diagram of retransmitter is shown in Fig. 4, 66 indicating a receiving loop fixed at a receptive angle to the transmitting antenna of the master transmitter, and tuned to its frequency, the loop being in circuit with a thermionic oscillator 67 with grid 68, grid-leak condenser 69, and plate 70, primary winding of audio transformer 71 which is in series with a plate battery 72 having its negative terminal connected to filament or cathode 73 of the oscillator. The secondary 74 winding of this transformer is wound over the core 74', and is connected to the grid 75 and cathode 76 of the audio amplifier tube 77 having plate 78 which is energized from a battery 79 through the coil 80. The latter may be the winding of a magneto telephone having magnetic core 81 associated with a juxtaposed iron diaphragm 82. This diaphragm is adapted to vibrate in front of an input receiving horn 83 attached to the sound chamber 84, which may, for convenience, be of a material such as rubber, say of 1-inch diameter, and coiled in a 20-inch circle constituting a form of Helmholtz resonator.

At 85 is shown a by-pass sound column for producing out-of-phase "echoes" which form characterizing image indicia on the screen of a visual indicating means as hereinafter set forth. From the output horn 86 of the sound chamber, sound energy vibrates the associated iron diaphragm 87 of the magneto telephone having a magnetic core 88 with surrounding winding 89, thereby collecting the energy from the sound-vibrated diaphragm 87 and delivering it to the grid 90 of the audio amplifier 91. This includes cathode 92 and plate 93 which feeds this amplified energy into the primary winding of an audio frequency transformer 94 by means of variations of the voltage of the plate battery 95. At 96 is shown the core of the audio frequency transformer having the secondary winding 97, the output of which feeds the plate circuit of the oscillator tube 98, having the plate 99, through choke coils 100, 101 to the cathode 102. At 103 is shown the grid of the oscillator tube and at 104 the grid-leak condenser, while a plate blocking condenser is indicated at 105, a tank coil at 106, and a tank coil tuning condenser at 106'. At 107 is shown the coupling coil of the retransmitting antenna 108.

Figure 7:
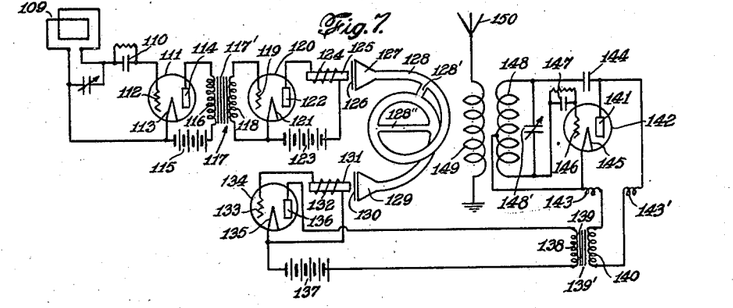
Fig. 7 is a view similar to Fig. 4 with acoustical delay means modified to introduce a different characterizing element into the retransmitted energy.

A second and similar retransmitting apparatus is shown in Fig. 7, a receiving loop 109 thereof being positioned at a receptive angle to master transmitter 10, Fig. 1, but at a substantially non-receptive angle to the other transmitters. At 110 is shown the grid-leak and condenser of a receiving detector tube 111 having grid 112, cathode 113, and plate 114 with plate battery 115 energizing the primary winding 116 of the audio transformer 117 with core 117' and secondary winding 118. The latter energizes the grid 119 of an audio amplifier 120 having cathode 121 and plate 122 energized by plate battery 123, the variations of the energy from which flows through the coil 124 of the magneto telephone having magnetized core 125 and associated iron diaphragm 126.

This iron diaphragm vibrates in front of the input horn 127 of a sound chamber 128, having by-pass air columns 128'—128'' for producing identifying indicia of the transmitter on a visual indicating means such as a cathode ray tube screen, as hereinafter set forth, said indications having characteristics differing from those of the remaining retransmitters and the master transmitter. At 129 is shown the output horn of the sound chamber 128, from which sound vibrates the associated iron diaphragm 130 in juxtaposition to the permanent magnet 131 of the magneto telephone having winding 132 in which is generated varying voltages which correspondingly energize the grid 133 of the audio amplifier tube 134. This tube has the cathode 135, plate 136, and plate battery 137, voltage variations of which flow through the primary 138 of the audio frequency transformer 139 having core 139' and secondary winding 140. The amplified energy from winding 140 feeds the plate 141 of oscillator 142 through choke coils 143 and 143'. A blocking condenser 144 separates the direct from the alternating current. At 145 is shown the cathode and at 146 the grid of the oscillator tube having the grid-leak and condenser 147. At 148 is shown the tank coil and at 148' the tuning condenser of the oscillator circuit, while 149 indicates the coupling coil to the antenna 150 which is tuned to radiate the same frequency as that of the master transmitter 10.

Figure 3:
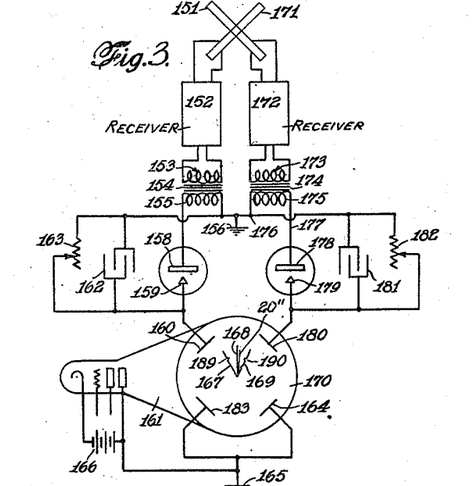
Fig. 3 is a diagrammatic view illustrating the electrical connections and means at an observation station for affording indications (visual) of the effects of energy transmitted from the master transmitter and from the several retransmitters.

The receiver and indication means for the pulse energies transmitted by the master transmitter 10 and the retransmitters are set forth in Fig. 3, 151 designating a first receiving loop tuned to the frequency of all of the retransmitting beacon frequencies, which should be the same as that of the master transmitter 10. At 152 is shown a first receiver associated with loop 151, 153 designating a first output transformer with core 154 and secondary winding 155. One terminal of this winding is grounded at 156 and the other energizes the plate of the rectifier 158, which should preferably be of the thermionic type, having a cathode 159 through which flows the rectified energy from the output transformer to one horizontal deflector 160 of a cathode ray tube 161. In shunt to the deflector 160 and ground are the pulse timing condenser 162 and a variable resistance 163.

At 164 is shown the cooperating horizontal deflector plate which forms the return through ground 165 of the rectified energy from the output transformer winding 155. At 166 is shown the conventional cathode ray tube second anode battery or high potential source which creates the beam from the deflections of which the images 167, 168, and 169 on the cathode ray screen 170 are formed.

A second receiving loop 171, preferably fixed at right angles to loop 151, collects energy for a second receiver 172, as near like the first as possible. Both may be of the superheterodyne type and include the usual first detector, intermediate frequency amplifier, second detector, and output audio amplifier. At 173 is shown a second output transformer similar to 153, having core 174 and secondary winding 175, one terminal 176 of which is connected to ground and the other terminal 177 being connected to the plate 178 of a second rectifier similar to the rectifier 158. The said rectifier has a cathode 179 connected to one vertical deflector 180 of the cathode ray tube 161, and in shunt with this deflector and ground are the second pulse timing condenser 181 and a variable resistance 182, the cooperating vertical deflector 183 being grounded at 165. The characteristic images 167, 168 and 169 on the cathode ray tube screen 170 result from the reception of energy from transmitters 10, 13, and 20, and 189 and 190 indicate the characteristic "kinks" of two of the image lines. The reference indication 20'' resulting from the local transmitter 20' will assume a fixed position on the screen, and characterization of this indication is optional.

The acoustical inductance or sound delay circuit arrangement shown at 84, Fig. 4, may conveniently consist of a length of 1-inch internal diameter rubber hose, the length being determined from the speed of sound. Assuming the average speed of sound in air to be approximately 1,000 feet per second, a delay of $\frac{1}{200}$ second is required between reception of the master pulse energy and the retransmission of this amplified pulse energy by the beacon next in the series, it is readily seen that, disregarding the time constants of the transmitting and receiving electromagnetic units, which are relatively unimportant, an air column equivalent to $\frac{1}{200}$ of 1,000, or 5 feet in length, would be required for the first retransmitter beacon of the series after the master transmitter.

The sound column of the second beacon delay circuit would then be 10 feet in length to allow a delay of $\frac{2}{200}$ second between the reception of the master pulse energy by the receiver of the second beacon and its retransmission from this beacon.

If there are nine beacons in the series, exclusive of the master beacon, the tenth beacon would have a sound column having a delay of $\frac{9}{200}$ second, and would be 45 feet in length. If the master pulse energy frequency has been chosen as 15 per second, for example, it will be seen that none of the beacon signals will overlap and each will produce its characteristic indicium on the cathode ray receiving screen, as hereinbefore described.

Each sound column which is formed thus by a tube should preferably be convoluted by coiling the tube, a convenient diameter of a coil being 20 inches, and these coils should preferably be wound on a wooden or other form, with an air space between walls of adjacent coils to prevent undesired echoes.

For simplicity of explanation, I have described the ordinary magneto telephone as an energy exchange device between the acoustical delay circuits, but it is to be understood that more sensitive devices such as microphones and dynamic type loudspeakers may also be employed.

It is advantageous to fix the diaphragm of the unit transmitting the amplified pulse, such as shown at 82, Fig. 4, directly in the center of the input horn 83 of the sound column 84, and to close the sound column by making an air-tight junction between the diaphragm and the horn. The same construction applies to the output horn 86 and pick-up diaphragm 87.

Similarly, in place of the coiled rubber pipe or hose for the sound inductance or delay circuit, straight tubes of fibre or plastic may be used.

The characterizing pulse of each beacon is produced as follows. As shown in Fig. 4, at 85, a straight length of hose of rubber or fibre, of smaller diameter than the main sound column, is inserted across a turn of the air column which consequently arrives at the output end of the coil before the main sound, and produces a "leading" sound current which deforms the transmitted pulse which shows on the received cathode ray screen image as a "king" 189 in the line. By producing either variations of this line or repetitions of it on the same line, characterization is accomplished.

It will be understood that other delay circuits, such as electrical delay circuits including inertia means consisting of large inductances and capacities, may also be used in the system, but I have found that such circuits are more difficult to characterize than the acoustical delay circuit described.

Such characterization is necessarily limited to a few beacons and where more extended characterization is required, the "flashing" method is chosen. For example, as indicated in Fig. 4, a code wheel or disc 200 is provided with a contact-making brush 201, the wheel being rotated at a speed commensurate with the Morse or other character cut on the periphery of the wheel. These characters in the form of contact fingers 202 on the edge of the disc intermittently short-circuit, through a resistance 203, the biasing battery 204 which normally holds the amplifier 77 inoperative, this intermittent contact-making producing the Morse letter in the beacon transmission frequency of 15 pulses per second, each pulse having a radio frequency corresponding to the master beacon radio frequency.

The result is to produce a "blinker" signal on the receiving cathode ray screen by extinguishing and reestablishing the visual signal image line in accordance with the desired characterizing transmitted signal.

The Morse key 205 permits the transmission of intelligence by radio messages when the switch 206 is thrown to cut out the code wheel and cut in the key. When the acoustical delay circuit or similar delay circuit characterization method is used, the switch 206 completes the transmission circuit. The undesired "blinker" signals may be covered with a mask of opaque materials such as black paper (not shown).

The amplifiers of the delay transmitting system should preferably be variable in output and be sufficiently powerful to produce a pulse at the required beacon suitable for its transmitting range. For example, a 10-watt beacon transmitter would require at least a 10-watt amplifier for producing the final oscillator plate circuit pulse.

In the practical application of the invention, the district over which the master transmitter exerts control should be confined to an area within its practical transmitting range, for example, all retransmission beacons of the system may be located within a 200-mile radius of the master transmitter.

I have found that by varying the timing of the pulse frequency of the master transmitter and by varying the delay circuits of the various retransmitter beacons and the constants of the cathode ray tube deflector input circuits, such as the capacities 162 and 181 and resistances 163 and 182, Fig. 3, there is no difficulty in producing as many as ten separate radial lines on the cathode ray screen, and with careful attention to adjustment, many more lines may be produced in a single quadrant of the screen.

The method of adjusting the pulse frequency and the corresponding deflection constants is described in detail in my copending application for U. S. Letters Patent Serial #485,113, for Tri-dimensional radio navigational system. In general, it may be stated that the smaller the capacity and the less the shunt resistance across this capacity, the more lines per inch may be produced on the screen for a given pulse frequency.

A permissible separation of these lines in a single quadrant on a 4-inch circular screen would be about 2 degrees apart, thereby allowing the simultaneous viewing without interference of at least ten beacons, all on the same frequency.

The amount of visual interference is determined by the positions of the various beacons with respect to the receiver. Where two beacons are directly in line with the receiver there will be such visual obscurity, but even here the difference in line length due to differences in attenuation of the received signal, together with, for example, the characteristic flashing of an image, enables the operator to distinguish between such interfering beacon image lines should they coincide; but in the case of a swiftly flying plane, this condition exists for a few seconds only. A preferred method of allocating frequencies is to place all aircraft on one frequency, frequency 1, for example 350 kc., and all water craft on frequency 2, for example 300 kc.

Assuming that there may be ten aircraft beacons in a district, they may all be controlled by radio frequency 1 on the pulse generator of the master beacon.

Assuming that in the same district there are an equal number of water craft beacons or lightships, these may all be controlled by radio frequency 2, likewise from the master beacon pulse generator which then radiates frequency 2 from another oscillator (not shown).

All beacons on one radio frequency are individually timed by means of progressively increased delay circuits, to radiate this pulse as received from the master beacon in sequential order, care being taken not to give such wide separation between delay circuits that phases overlap. By this is meant that only the time between two sequential pulses from the master generator should be allowed for division into time delays. As an example, where the pulse frequency is 15 per second, $\frac{1}{15}$ of a second is the maximum delay-time for distribution among the various time delay circuits of the beacons of the district. Sufficient time delay must always be allowed for the cathode ray spot to return to the center of the screen between the reception of any two beacons of the system, and this is made possible by adjustment of the time constants of the deflector circuits of the cathode ray tube.

As an example of the sequential order, assuming a master beacon pulse frequency of 15 per second, a transmission beacon of the series may reradiate the pulse at the master beacon frequency with a delay of $\frac{1}{200}$ of a second. Another beacon of the series radiates the same pulse with a delay of $\frac{2}{200}$ of a second, another with a delay of $\frac{3}{200}$ of a second, until finally the last or tenth beacon radiates the pulse with a delay of $\frac{9}{200}$ of a second, there being a time space of $\frac{1}{200}$ seconds between each pulse as received on the cathode ray screen. It will thus be seen that the sum of all delays is less than 1/15 of a second or the time interval between pulses.

As the master pulse frequency is within the persistence of vision range, for example 15 pulses per second, all image lines will appear as separate lines simultaneously on the screen, each indicating the direction of the beacon corresponding to the beacon flashing, or the number of characterized "kinks" in the line.

It is understood that these characterizing kinks as transmitted by the sound echoes even though they are limited in number but not in shape, are useful for characterizing fewer beacons than the "flashing" characterization which is limited only by the alphabet or number combinations.

Simultaneously, on radio frequency 2, another ten beacons for marine use may be operating without interference. Also, simultaneously, with proper attention paid to attenuation, various separated groups may be operating throughout the United States, for example, on these two frequencies. These groups should preferably be located in such manner that every other zone in which a particular group of beacons is located is of a different frequency. That is to say, the order of groups may be radio frequency 1, radio frequency 2, frequency 1, frequency 2, and so on, in a line extending across the entire country both north and south and east and west, the distance between groups being sufficiently great to prevent interference between like frequencies. Even if such interference should occur, very little harm could result, as the weak signals from the distant zone would only slightly shift the direction indication of the desired zone, and this could happen only when the interfering beacon would be in a direct line with the desired beacon, which would rarely happen.

Except for this condition, interference from the distant zone beacon appears as merely another line on the screen of very short length, and may be disregarded. When the system is used for course flying, the procedure is as follows. In point-to-point flying, the pilot steers the plane until the characteristic image lines of the beacon from which he is flying and the beacon to which he is flying coincide, and maintains this condition throughout the flight, or if weather conditions interfere, he may allow a predetermined angle between the lines. Meanwhile, the relative direction of all the other aircraft beacons in the district are available on the screen simultaneously throughout the flight.

When the receiving apparatus is located at a fixed observation station, as described in my copending U. S. application Serial #485,113, the system may be employed to produce on the receiving screen of a cathode ray tube a reference line from which the position of a moving transmitter, such as an incoming plane, for example, may be instantly indicated on the screen by the angle of its signal line with relation to the reference line formed by the reception of the master beacon transmitted pulse.

The procedure is as follows. The master beacon should be located within sight of the observation station and preferably due north of it, making pelorus readings possible. It is to be understood that latitude and longitude of both master beacon and observation station is known, and by means of pelorus readings, a reference line is established on the receiving cathode ray screen, which is to be always maintained exactly in line of sight with the master beacon transmitter.

Without any further assistance from astronomical observations, the positions (direction and distance) of any transmitter, fixed or mobile, may be instantly determined by referring to its signal line on the screen, and noting the divergence from the reference line in degrees on an associated scale.

The same principle may also be used to maintain equality between the pair of identical receivers of a Watson-Watt cathode ray compass.

The procedure is as follows. The pulse energy signals from the master beacon are received on a local receiver, the receiving directional loop of which is at a null position relative to a small local oscillator with transmitting loop located in a fixed and equi-signal position relative to the two loops at right angles to each other which are used for the determination of direction and distance.

A practical way of doing this is to mount the local oscillator or signal generator with its transmitting loop fixedly to the direction-finding loops by attaching the local oscillator loop to the shaft upon which is mounted the direction-finding loops, so that if these are rotated, the oscillator loop moves with them, as set forth in my said copending application. By the use of attenuators or volume controls on each direction-finding receiver, there is maintained a reference line on the cathode ray screen produced by the reception of a pulse from a craft transmitter by the local receiver. This pulse is relayed from the local receiver to the local oscillator which, in turn, transmits it to the cathode ray compass receivers, producing the reference line on the screen with a delay of a fraction of a second but simultaneously (within the persistence of vision) with the reception of the signal from the fixed or mobile station, the position of which is sought.

The null method of direction-finding is carried out as follows. The usual single rotating loop and receiver (which may be one of a pair of cathode ray direction-finding loops) is employed in conjunction with the cathode ray tube producing the characteristic image lines. The line which gradually grows shorter until it disappears as the loop is slowly rotated, will be indicative of the null position of the loop relative to the beacon characterized by the disappearing signal line.

Contrary to expectations, the null method is operative even if two image lines coincide, because as one line becomes shorter by rotating the loop, the light intensity of the line increases and makes it possible to separate the two lines by characterization. Telephonic communication between planes and between beacons and planes should preferably be carried on at the higher frequencies which are suitable for communication but not for direction-finding.

Alternatively, they may be carried on at the existing low frequencies, omitting only the two frequencies allocated for position-finding, as herein described.

An alternative method of producing the required delay between the various transmitters of the system is to receive the pulse from the master beacon, and after audio amplification to utilize the amplified pulse energy to energize the recording magnet of a Poulsen telegraphone. This instrument, as is well known, operates on the principle of localized magnetization. A steel wire is slowly passed before a magnetic transmitting coil and this wire becomes locally magnetized in accordance with the magnetizing power of the coil at any instant. By reversing the process, that is, passing the locally magnetized wire slowly in close proximity to a receiving magnet, currents are generated in the winding in accordance with the locally magnetized portions of the wire. The delay circuit may be constructed utilizing the principle of local magnetization in the following manner, reference being to Fig. 5. As shown, a spool 210 from which a steel wire 211 is slowly unwound and rewound on second spool 212 feeds the wire in close proximity to a receiving magnet 213, the core of which is beveled and fixed in close proximity to the slowly moving wire (about one foot per second, for example). The magnet coil 213 is fed from the output of the receiver of a beacon which receives the initial pulse energy from the master beacon and amplifies it at audio frequency. This amplified pulse energy produces a local magnetization of the wire 211 at the spot 214 in accordance with the sound wave shape of the master beacon pulse.

Figure 5:
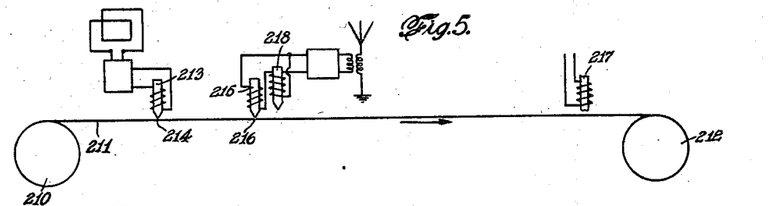
Figs. 5 and 6 are similar views illustrating further expedients for effecting delay in the retransmission of energy, both indicating electrical inertia-means—the latter by inductive action and the former by magnetic action, including characterizing means.

A second magnet coil 215 similar to the first is fixed at a point 216 on the wire a slight distance (depending upon the delay required) from the first coil. As an example, if the delay between the master beacon transmitter pulse and the next beacon in sequential order is desired to be $1/12$ second, then the magnet coil 213 is to be placed 1 inch from the magnet coil 215, since it will take a point on the wire that length of time to pass from spot 214 to point 216, at the previously mentioned speed of one foot in one second.

It will be seen that any required time delay may thus be produced by suitably spacing the magnet coils 213 and 215 at the different retransmitting beacon stations. An erasing magnet 217 is placed at the point where the wire enters the spool 212.

For characterization purposes, a magnet 218 similar to the magnet 213 is placed in close proximity to said magnet 215 and the wire, said magnets being connected in parallel. The characterizing magnet 218 is at a greater distance from the wire 211 than the magnet 213. The result of this arrangement is to produce a double image on the cathode ray screen, the magnet 218 producing a phantom image close to the image proper produced by magnet 213. By various arrangements of one or more of these characterizing magnets, any desired number of characterizations may be obtained of signal indications from different retransmission beacons.

Figure 6:
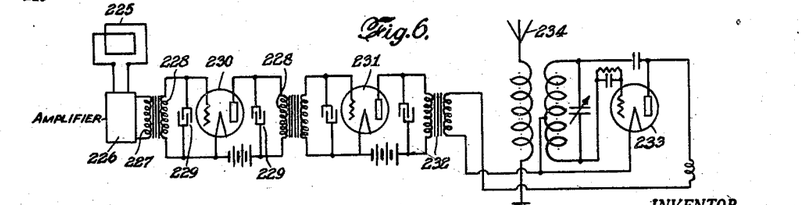

A delay circuit for very short intervals of time between sequential beacon transmitters may be of the electrical type, shown in Fig. 6 in which a receiving loop 225 receives the pulse energy from the master beacon and detects and amplifies the pulse at audio frequency, by means of the amplifier 226 from which the energy is passed through the circuit of the transformer 227 having a large time constant because of its large inductance 228 and the large shunt capacity 229. This transformer energizes the repeaters (not amplifiers) 230 and 231, from the last in the series of which the energy is fed to an output transformer 232, which in turn passes the amplified pulse to the plate circuit of the oscillator 233 energizing the transmitter 234. Each sequential beacon in the series is provided with one more repeater stage than the preceding beacon, thereby producing a time interval between beacon retransmissions.

The reason for the use of repeater stages without amplification except in the first or last stage, is to prevent audio feedback or howling. Such repeater stages are suitable for delays of the order of $1/1000$ second between beacon transmissions, and the time constants of the cathode ray deflectors of the indicator must be very short, that is, with very small capacity in shunt with the deflectors, and very low resistance in shunt with the capacity.

Figure 8:
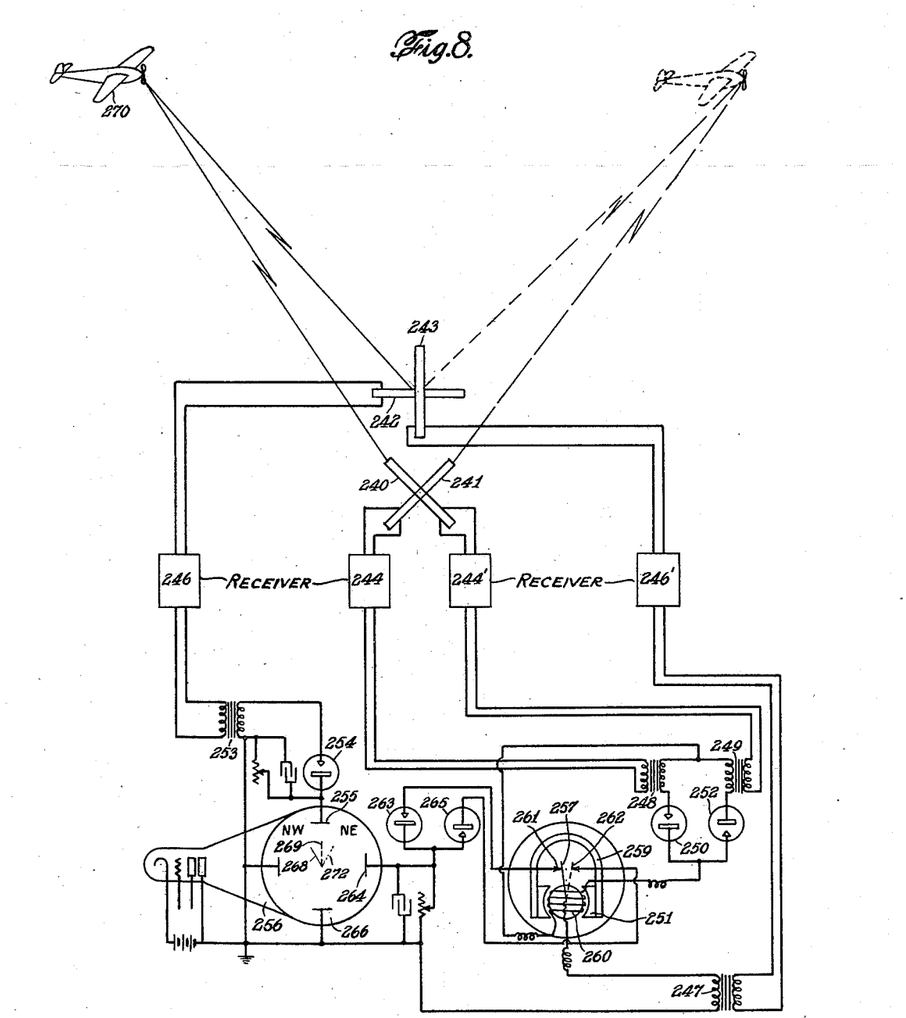
Fig. 8 is a diagrammatic view of an arrangement for indicating the effects of energy transmitted and retransmitted, wherein provision is made for eliminating quadrantal ambiguity.

The quadrantal ambiguity which ordinarily exists in the cathode ray compass may be eliminated as follows:

Referring to Fig. 8, 240 and 241 designate two crossed directional loops fixed at an angle of 90° to each other. These loops, which may for convenience be called auxiliary loops, are tuned to the same frequency as the main similarly crossed directional loops 242 and 243; but they are oriented to a position 45° from the position of said main loops and fixed in this position.

Two auxiliary receivers 244 and 244' tuned to the same frequency as the main loops and their receivers 246 and 246' have the input circuits connected to the auxiliary loops 240 and 241, respectively, and their output circuits to output transformers 248 and 249. The secondary winding of the output transformer 248 is connected through a rectifier 250 to the winding of the armature of a dynamometer relay 251; and the secondary winding of the output transformer 249 is connected through a rectifier 252 to the same winding of the dynamometer relay. The rectifier 250 is connected in opposite polarity to the rectifier 252, thus forming two paths through the dynamometer winding 251, one for positively polarized direct current and the other for negative.

The main crossed directional loops 242 and 243 are connected to the input of the main receivers 246 and 246'. The output of main receiver 246 is connected to the primary winding of an output transformer 253. The secondary winding of this output transformer 253 is connected through a rectifier 254 to the deflector 255 of the cathode ray tube 256.

The secondary winding of the other output transformer 247 is connected to the pivot of the switch 257 which is the tongue of the dynamometer or meter relay 251, having magnet 259, dynamometer coil winding 260 and contacts 261 and 262 which may be alternately contacted by the relay tongue 257. The contact 261 of the relay is connected to the filament of a rectifier 263 in series with the deflector 264 of the cathode ray tube, and the contact 262 is connected to the plate of another rectifier 265 in series with the same deflector, depending upon which contact the relay tongue 257 rests.

The cathode ray screen 266 may be considered to have its upper half divided into two quadrants, NW and NE. Any image appearing on the screen will appear in either the quadrant NW or NE depending upon the polarity of the rectifiers 263 and 265 which are placed in series with the deflector 264 by the action of the relay tongue 257. It is important that this tongue be adjusted almost midway of the two electrical extremes of its repulsion, which means that the contacts 261 and 262 must be very close together as regards their separation from the relay tongue contacts.

In other words, only a very small air gap of the order of a few thousandths of an inch should separate the relay tongue from the fixed contact 262 when the fixed contact 261 is touching the tongue, and the position of the relay tongue with this adjustment should be in the electrical center of the dynamometer relay.

Assuming now that the plane 270 is flying from its position in the NW earth quadrant to a position (shown in broken lines) in the NE earth quadrant, at the start the loop 240 receives the preponderance of energy from the plane's transmitter, because it is more nearly in line with the plane, while the loop 241 receives only a small fraction of the transmitted energy because it is in an almost non-receptive position, that is, at right angles to the direction of propagation. This causes the receiver 244' to translate an amplified pulse to the output transformer 249 which is passed through the rectifier 252 and appears as direct current in the dynamometer coil winding 260, thereby swinging the relay tongue to the left to the contact 261. This has the effect of closing a circuit through the stationary contact 261 which causes a pulse which has been simultaneously received by the main receivers 246 and 246' to appear at the deflector 264 through the rectifier 265, and deflects the signal spot or line 268 to a position in the lefthand or NW quadrant of the screen.

When the plane has arrived at a position half way between NW and NE, this image line will have moved to a position halfway between the two quadrants, NW and NE, that is to say in the position shown by the broken line 269 radiating from the center of the screen toward the circumference. At this point, auxiliary loops 240 and 241 receive the plane's transmitted pulse or train of pulses, as equi-signal effects, and the dynamometer relay tongue assumes a neutral position, just halfway between the contacts 261 and 262. Because of this, the energy to the deflector 264 of the cathode ray tube is momentarily cut off, but this condition maintains for only a fraction of a second, when the tongue shifts to contact 262 as the plane passes the half-way mark. Upon making contact with contact 262, the deflector 264 is again energized, but in the reverse direction, due to the reversed polarity of rectifier 263.

The image line 272 (shown as a dotted line) now appears as radiating from the center toward the circumference of the screen but very slightly out of the vertical, being inclined toward the NE quadrant. From this point on, for example when the plane assumes the position shown in dotted lines, the auxiliary loop 241 receives most of the energy from the plane's transmitter, and consequently the associated receiver 244, output transformer 248 and rectifier 250 pass a preponderance of energy through the dynamometer coil 260 which causes the relay tongue to hug the right-hand contact 262 during the remainder of the flight into the NE earth quadrant.

Simultaneously, the main loops 242 and 243 deliver their correct proportions of energy to the deflectors 264 and 255, the former of which is now oppositely polarized by the rectifier 263 and consequently the image line remains in the NE quadrant but at different radial positions in that quadrant, throughout the flight.

Thus, the image line has continually pointed at the plane as it passed over two earth quadrants and traversed two screen quadrants.

Alternatively, the right-left homing compass described in Bulletin No. 18, March 15, 1932, U. S. Dept. of Commerce, may be used in place of the auxiliary crossed loops 240 and 241 and associated apparatus. In such case, the split loop of said homing compass should be fixed with its plane in an east-west line (parallel to loop 242, Fig 8 of the drawings), and to the dynamometer of the compass shown in the bulletin there would be added the relay connections of tongue 257 and contacts 261 and 262.

I claim:

1. Single-frequency radio beacon system, comprising a plurality of separated omnidirectional transmitters of electromagnetic energy, including a master transmitter of electromagnetic waves and a plurality of transmitters distant from the said master transmitter and operated therefrom, all of said distant transmitters operating at a common frequency; a pulse generator associated with the master transmitter to cause the same to transmit a train of intermittent pulses of electromagnetic energy; receiver and amplifier means at each of the distant transmitters for receiving and amplifying the pulse energy from the master transmitter; and means to energize sequentially the respective distant transmitters from the amplifier received energy and including means for introducing a predetermined time interval between successive transmissions to accommodate persistence of vision.

2. Single-frequency radio beacon system, comprising a plurality of separated omnidirectional transmitters of electromagnetic energy, including a master transmitter of electromagnetic waves and a plurality of transmitters distant from the said master transmitter and operated therefrom, all of said distant transmitters operating at a common frequency; a pulse generator associated with the master transmitter to cause the same to transmit a train of intermittent pulses of electromagnetic energy; receiver and amplifier means at each of the distant transmitters for receiving and amplifying the pulse energy from the master transmitter; means to energize sequentially the respective distant transmitters from the amplified received energy and including means for delaying for a predetermined period the retransmission of energy from said distant transmitters; an observation station; a directional receiver means thereat tuned to the frequency of the plurality of distant transmitters; and means to utilize the energy received by said directional receiver means.

3. Single-frequency radio beacon system, comprising a plurality of separated omnidirectional transmitters of electromagnetic energy, including a master transmitter of electromagnetic waves and a plurality of transmitters distant from the said master transmitter and operated therefrom, all of said distant transmitters operating at a common frequency; a pulse generator associated with the master transmitter to cause the same to transmit a train of intermittent pulses of electromagnetic energy; receiver and amplifier means at each of the distant transmitters for receiving and amplifying the pulse energy from the master transmitter; means to energize sequentially the respective distant transmitters from the amplified received energy and including means for delaying for a predetermined period the retransmission of energy from said distant transmitters; an observation station; a directional receiver means thereat tuned to the frequency of the plurality of distant transmitters; visual means for indicating the effect of the energy received by said directional receiver means; and means to separate the indications on the visual means.

4. Single-frequency radio beacon system, comprising a plurality of separated omnidirectional transmitters of electromagnetic energy, including a master transmitter of electromagnetic waves and a plurality of transmitters distant from the said master transmitter and operated therefrom, all of said distant transmitters operating at a common frequency; a pulse generator associated with the master transmitter to cause the same to transmit a train of intermittent pulses of electromagnetic energy; receiver and amplifier means at each of the distant transmitters for receiving and amplifying the pulse energy from the master transmitter; means to energize sequentially the respective distant transmitters from the amplified received energy and including means for delaying for a predetermined period the retransmission of energy from said distant transmitters; an observation station; a directional receiver means thereat tuned to the frequency of the plurality of distant transmitters; a local retransmitter having receiver means directive with respect to the master transmitter, said receiver means including means for delaying the retransmission of energy in sequential order relative to the retransmission of energy by other transmitters; and visual means for indicating the effect of the energy received by the directional receiver means and the local retransmitter receiver means.

5. The system of claim 4, wherein the indication effected through the local retransmitter receiver means constitutes a reference line on said visual means.

6. The system of claim 2, wherein the directional receiver observation station includes a cathode ray tube with screen for indicating thereon the received energy, and a pair of directional crossed loops are connected through intermediate translation means respectively to the deflectors of said cathode ray tube.

7. The system of claim 2, wherein the respective delay periods of the retransmission, by the distant transmitters, of electromagnetic pulse energy received from the master transmitter are different from one another.

8. The system of claim 2, wherein the respective delay periods of the retransmission, by the distant transmitters, of electromagnetic pulse energy received from the master transmitter are different from one another, the sum of the delay periods of all retransmitters of energy being less than the time interval between pulses of the master transmitter.

9. The system of claim 2, wherein there is associated with the means for delaying the retransmission of energy means for affording station identification.

10. The system of claim 2, wherein the means for delaying the retransmission of energy comprise energy-exchange means including an acoustical sound column.

11. The system of claim 2, wherein the means for delaying the retransmission of energy comprise energy-exchange means including an acoustical sound column, the column being distorted for station identification.

12. The system of claim 2, wherein the means for delaying the retransmission of energy comprise energy-exchange means including electrical inertia-means.

13. The system of claim 2, wherein the means for delaying the retransmission of energy comprise energy-exchange means including magnetic inertia-means.

14. The system of claim 1, wherein the receiver means of the distant retransmitters of energy are of the directional type and directed toward the master transmitter.

EDWARD G. GAGE.

REFERENCES CITED

The following references are of record in the file of this patent:

UNITED STATES PATENTS

| Number | Name | Date |
| --- | --- | --- |
| 2,134,716 | Gunn | Nov. 1, 1938 |
| 1,945,952 | Nicolson | Feb. 6, 1934 |
| 1,894,019 | Buckley | Jan. 10, 1933 |

FOREIGN PATENTS

| Number | Country | Date |
| --- | --- | --- |
| 116,666 | Australia | Oct. 10, 1941 |
| 116,667 | Australia | Oct. 10, 1941 |